US011375296B2

(12) United States Patent
Mingolla et al.

(10) Patent No.: US 11,375,296 B2
(45) Date of Patent: Jun. 28, 2022

(54) SERVER-SIDE AD INSERTIONS (SSAI) WITH ADDITIONAL METADATA AND CLIENT FUNCTIONALITY

(71) Applicant: Brightcove Inc., Boston, MA (US)

(72) Inventors: Jacob John Mingolla, Boston, MA (US); Craig Rodman Barstow, Boston, MA (US); Thomas Herbert Ruggles, III, Boston, MA (US); Jon-Carlos Rivera, Boston, MA (US); Travis Albert Sein, Boston, MA (US)

(73) Assignee: BRIGHTCOVE INC., Boston, MA (US)

( * ) Notice: Subject to any disclaimer, the term of this patent is extended or adjusted under 35 U.S.C. 154(b) by 0 days.

(21) Appl. No.: 17/334,656

(22) Filed: May 28, 2021

(65) Prior Publication Data

US 2021/0377630 A1 Dec. 2, 2021

Related U.S. Application Data

(60) Provisional application No. 63/031,446, filed on May 28, 2020.

(51) Int. Cl.
*H04N 21/8545* (2011.01)
*H04N 21/239* (2011.01)
(Continued)

(52) U.S. Cl.
CPC ....... *H04N 21/8545* (2013.01); *H04N 21/232* (2013.01); *H04N 21/2393* (2013.01);
(Continued)

(58) Field of Classification Search
CPC ............ H04N 21/8545; H04N 21/232; H04N 21/23424; H04N 21/2393; H04N 21/84;
(Continued)

(56) References Cited

U.S. PATENT DOCUMENTS 9,680,689 B2 * 6/2017 Broome ............ H04L 29/08756
10,123,087 B1 * 11/2018 Killick ............... H04N 21/2662
(Continued)

OTHER PUBLICATIONS

IAB Tech Lab. Video Ad Serving Template (VAST). Dec. 31, 2018 [retrieved on Aug. 4, 2021]. Retrieved from the internet <URL: https://iabtechlab.com/wp-content/uptoads/2018/11/VAST4.1-final-Nov-8-2018.pdf> entire document.
International Search Report and Written Opinion for PCT/US2021/034908 dated Sep. 10, 2021, all pages.

*Primary Examiner* — Jefferey F Harold
*Assistant Examiner* — Timothy R Newlin
(74) *Attorney, Agent, or Firm* — Kilpatrick Townsend & Stockton, LLP (57) ABSTRACT

A method of providing customized interaction of a media player based on metadata obtained from an origin server. In one step, the origin server obtains metadata related to an active substream content. The media player is provided a playlist for playing a primary video stream. The playlist includes a request for the metadata, the request being associated with the insertion of the active substream content in the playback of the primary video stream. The origin server receives the request for the metadata from the media player. The origin server inserts the active substream content and metadata segments into the primary video stream. A secondary video stream is obtained after insertion of the active substream content. The origin server provides the metadata to the media player using a metadata storage and a metadata service. The media player customizes the interaction using the metadata during playback of the secondary video stream.

20 Claims, 7 Drawing Sheets

(51) Int. Cl.
*H04N 21/232* (2011.01)
*H04N 21/234* (2011.01)
*H04N 21/81* (2011.01)
*H04N 21/84* (2011.01)

(52) U.S. Cl.
CPC ..... *H04N 21/23424* (2013.01); *H04N 21/812* (2013.01); *H04N 21/84* (2013.01)

(58) Field of Classification Search
CPC ........... H04N 21/812; H04N 21/26258; H04N 21/278; H04N 21/43079; H04N 21/4345; H04N 21/44222; H04N 21/4622; H04N 21/6543; H04N 21/6582; H04N 21/8456; H04N 21/8586
See application file for complete search history.

(56) References Cited

U.S. PATENT DOCUMENTS

| | | | |
|---|---|---|---|
| 10,863,211 B1 * | 12/2020 | Wu | H04N 21/2665 |
| 2016/0119661 A1 | 4/2016 | Jonnadula et al. | |
| 2016/0119694 A1 * | 4/2016 | An | H04N 21/6543 |
| | | | 725/32 |
| 2016/0165289 A1 | 6/2016 | McClanahan et al. | |
| 2016/0182593 A1 * | 6/2016 | Denoual | H04L 65/4092 |
| | | | 709/219 |
| 2017/0126256 A1 * | 5/2017 | Salomons | H04N 21/4825 |
| 2017/0359628 A1 * | 12/2017 | Sachdev | H04N 21/44016 |
| 2019/0149856 A1 | 5/2019 | Ramaley | |
| 2019/0174198 A1 * | 6/2019 | Eubanks | G06Q 50/01 |
| 2019/0313135 A1 | 10/2019 | Pathak et al. | |
| 2020/0412822 A1 * | 12/2020 | Allen | H04N 21/4826 |
| 2021/0377630 A1 * | 12/2021 | Mingolla | H04N 21/8545 |

\* cited by examiner

SERVER-SIDE AD INSERTIONS (SSAI) WITH ADDITIONAL METADATA AND CLIENT FUNCTIONALITY

CROSS-REFERENCES TO RELATED APPLICATIONS

This application is a non-provisional of and claims the benefit of U.S. Provisional Application No. 63/031,446, filed on May 28, 2020. The above-referenced provisional application is incorporated herein by reference in its entirety for all purposes.

BACKGROUND

Advertisements embedded in video streams allow advertisers to easily connect with a large audience. The advertisements provide the advertisers with unique opportunities to ensure widespread viewership. Ad-supported video streams are ubiquitous and allow consumers to view the video streams for free or at a reduced or minimal cost.

The insertion of advertisements in a video has traditionally been done using client-side ad insertion (CSAI) and Server-side ad insertion (SSAI). CSAI generally refers to a media player communicating directly with an ad provider to download and play advertisements while also providing related viewing analytics. CSAI solutions generally allow developers to include customizations within the player to facilitate increased interactivity with other page elements. However, obtrusive and distracting advertisements become annoying for the consumers, compelling them to use ad-blocking software to prevent playback of such advertisements. Moreover, the usage of ad blockers prevents gathering of analytics from the advertisements resulting in reduced profitability and sustainability of the ad-supported video.

Further, SSAI uses a server for ad insertions and analytics. Using SSAI helps prevents ad blocking, but traditional SSAI solutions may provide less accurate analytics and be less customizable than CSAI solutions. It is essential for the ad providers as well as the consumers to have an elicit page interactivity and customization that is reliable and difficult for traditional ad blockers to thwart.

SUMMARY

In one embodiment, the disclosure provides a method of providing customized interaction of a media player based on metadata obtained from an origin server. In one step, the origin server obtains metadata related to an active substream content. The media player is provided a playlist for playing a primary video stream. The playlist includes a request for the metadata, the request being associated with the insertion of the active substream content in the playback of the primary video stream. The origin server receives the request for the metadata from the media player. The origin server inserts the active sub stream content and metadata segments into the primary video stream. A secondary video stream is obtained after insertion of the active substream content. The origin server provides the metadata to the media player using a metadata storage and a metadata service. The media player customizes the interaction using the metadata during playback of the secondary video stream.

In an embodiment, the disclosure provides a method of providing customized interaction of a media player during playback of a video at the media player based on metadata. In one step, metadata corresponding to an active substream content for the playback of a primary video stream is obtained and stored by an origin server from a third-party provider. The metadata is stored in a metadata storage. A playlist for playing the primary video stream is provided to the media player. The playlist includes a request for the metadata. The request is associated with an insertion of the active substream content in the playback of the primary video stream. The request for the metadata is received by the origin server from the media player. The request is received during the playback of the primary video stream at the media player. Uniform Resource Identifiers (URIs) are inserted into the playlist for the metadata by the origin server. The active sub stream content along with metadata segments are inserted in the primary video stream by the origin server for obtaining a secondary video stream. The metadata corresponding to the active substream content is provided by the origin server to the media player using a metadata service. The metadata is provided by the origin server to the media player based on retrieval by the metadata service of Application Programming Interface (API) responses from the metadata storage using the URIs, and timing information of the active substream content from the origin server. The metadata including the timing information and the API responses is provided to the media player by the metadata service using the metadata segments. A functionality associated with the active substream content from the metadata is extracted by the media player. The interaction of the media player is customized during the playback of the secondary video stream based on the functionality associated with the active substream content.

In another embodiment, the disclosure provides a server configured to provide metadata for customization of an interaction of a media player during playback of a video at the media player. The server includes a communication interface, a memory, and a processor coupled with the communication interface and the memory. Metadata corresponding to an active substream content for the playback of a primary video stream is obtained from a third-party provider. The metadata is stored in a metadata storage. A playlist for playing the primary video stream is provided to the media player. The playlist includes a request for the metadata. The request is associated with an insertion of the active substream content in the playback of the primary video stream. The request for the metadata is received from the media player. The request is received during the playback of the primary video stream at the media player. Uniform Resource Identifiers (URIs) are inserted into the playlist for the metadata. The active substream content is inserted along with metadata segments in the primary video stream for obtaining a secondary video stream. A metadata service is provided with timing information of the active substream content. The metadata corresponding to the active substream content is provided to the media player using the metadata service. Application Programming Interface (API) responses are retrieved from the metadata storage by the metadata service using the URIs. The metadata including the timing information and the API responses is provided to the media player by the metadata service using the metadata segments. The media player extracts a functionality associated with the active substream content from the metadata to customize the interaction of the media player during the playback of the secondary video stream.

In yet another embodiment, the disclosure provides a non-transitory computer-readable medium having instructions embedded thereon for customizing interaction of a media player based on metadata during playback of a video, the instructions, when executed by one or more computers, cause the one or more computers to:

obtain by an origin server from a third-party provider, metadata corresponding to an active substream content for the playback of a primary video stream, and store the metadata by the origin server in a metadata storage;

provide, to the media player, a playlist for playing the primary video stream, wherein the playlist includes a request for the metadata, and the request is associated with insertion of the active substream content in the playback of the primary video stream;

receive by the origin server from the media player, the request for the metadata, wherein the request is received during the playback of the primary video stream at the media player;

insert by the origin server, Uniform Resource Identifiers (URIs) into the playlist for the metadata;

insert by the origin server, the active substream content along with metadata segments in the primary video stream for obtaining a secondary video stream;

provide by the origin server to the media player using a metadata service, the metadata corresponding to the active substream content, wherein providing the metadata by the origin server to the media player comprises:

retrieve by the metadata service:

Application Programming Interface (API) responses from the metadata storage using the URIs, and timing information of the active substream content from the origin server, wherein the metadata including the timing information and the API responses are provided to the media player by the metadata service using the metadata segments;

extract by the media player, a functionality associated with the active substream content from the metadata; and customize by the media player, the interaction of the media player during the playback of the secondary video stream based on the functionality associated with the active substream content.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
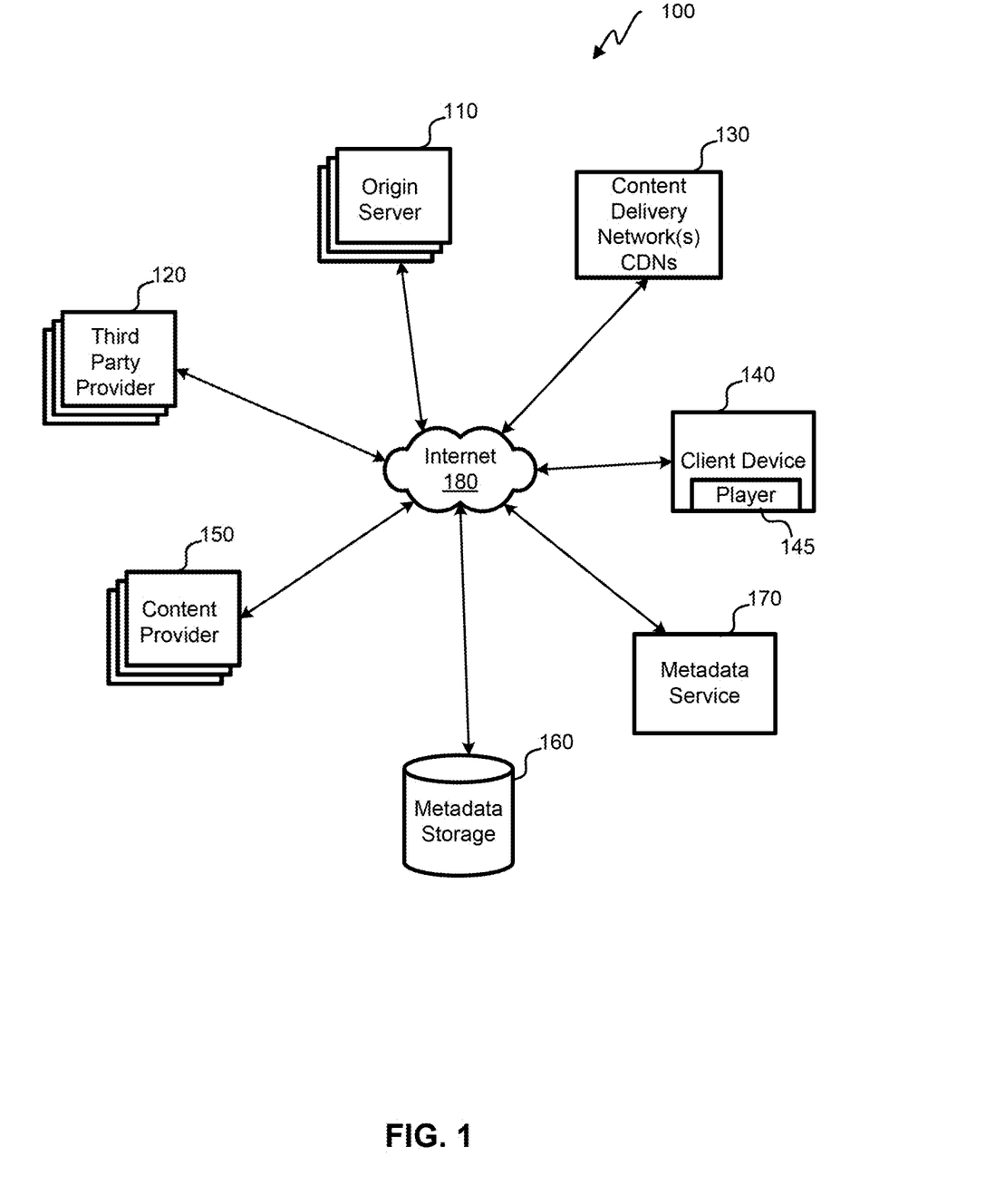
FIG. 1 illustrates a block diagram for a media servicing system directed towards an insertion of an active substream content into a video playback.

Referring initially to FIG. 1, a block diagram of a media servicing system 100 directed towards an insertion of an active substream content into a video playback, is shown. The media servicing system 100 includes an origin server 110, a third-party provider 120, content delivery networks (CDNs) 130, a client device 140, a media player 145 of the client device 140, a content provider 150, a metadata storage 160, and a metadata service 170. The media servicing system 100 may deliver media content to the media player 145, executed by the client device 140 providing media playback to an end-user of the client device 140. The media player 145 may be, for example, a media player, browser, or other application adapted to request and/or play media files. The media content may be provided via a network such as the Internet 180 and/or other data communication networks, such as a distribution network for television content. The client device 140 may be one of any number of devices configured to receive media over the Internet 180, and may include a mobile phone, a tablet, a personal computer, a portable media device, a television, a set-top box, a video game system, etc. Although only one media player 145 and one client device 140 are shown in FIG. 1, it will be understood that the media servicing system 100 may provide media to a number of media players 145 on a number of client devices 140. The active substream content may be, for example, an advertisement or a media content other than the advertisement.

For on-demand content, a media file provided by the content provider 150 is stored on the CDNs 130. The on-demand content is provided to the media player 145 via progressive downloading and/or streaming. For live content that is, in real-time or near-real-time, depending on processing times and/or other buffer times, a similar process can take place.

One or more of the third-party provider(s) 120 or (ad provider(s)) provide active substream content, which may include advertisements, to various media players 145 on various client devices 140. The third-party provider(s) 120 allows companies to show advertisements to end-users viewing the media content received from the content provider(s) 150. The third-party provider(s) 120 maintains advertisements and/or advertisement data separate from the media content.

The origin server 110 may be a server-side ad insertion (SSAI) server that processes the media content from the content provider 150 and the active substream content from the third-party provider 120. The origin server 110 inserts the active substream content into the media content and provides metadata to the media player 145 for customization of the interaction of the media player 145 during content breaks.

The metadata storage 160 and the metadata service 170 provides a means of communication between the origin server 110 and the media player 145 to provide the metadata to the media player 145. The metadata storage 160 is a repository for storing metadata responses from the third-party provider 120. The metadata responses are stored by the origin server 110 into the metadata storage 160 for processing and/or retrieval. The metadata responses may be Application Programming Interface (API) responses, ad-API responses, or Video Ad Serving Template (VAST) responses.

The metadata service 170 is used for retrieval of the metadata responses from the metadata storage 160. The metadata service 170 serializes the metadata responses from the metadata storage 160 into metadata segments suitable for consumption by the media player 145. The origin server 110 provides the metadata to the media player 145 using the metadata service 170 and the metadata storage 160. The metadata storage 160 stores and the metadata service 170 serves the metadata to the media player 145.

Figure 2:
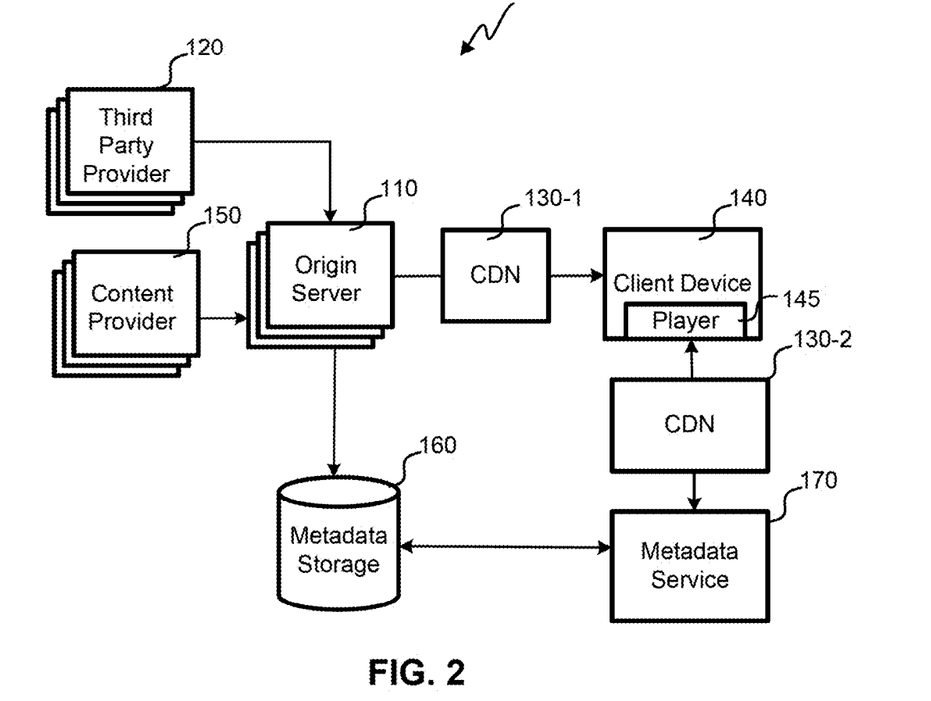
FIG. 2 illustrates a flow diagram for a media servicing system.

With reference to FIG. 2, a flow diagram of the media servicing system 100 is shown. The media servicing system 100 provides insertion of an active substream content into a video stream during playback of the video stream. The origin server 110 receives the video stream from the content provider 150 for playback on the media player 145 of the client device 140. The origin server 110 also receives the active substream content from the third-party provider 120. The origin server 110 further obtains metadata associated with the active substream content from the third-party provider 120. The third-party provider 120 further provides metadata responses including the VAST responses to the origin server 110. The metadata responses facilitate interactivity of the media player 145 during playback of the active sub stream content in a content break. The metadata responses include information for customizing the interaction of the media player 145. The origin server 110 stores the metadata responses in the metadata storage 160. The origin server 110 provides timing information associated with the active substream content to the metadata service 170.

The origin server 110 provides the video stream to the media player 145 for playback. A playlist or manifest file for playing the video stream is provided to the media player 145. The playlist includes a request for the metadata. The request is associated with the insertion of the active substream content in the playback of the video stream. The origin server 110 communicates with the client device 140 via the CDN 130-1. The CDN 130-1 provides integration between the origin server 110 and the media player 145.

The origin server 110 receives the request for the metadata from the media player 145. The request is received during the playback of the video stream at the media player 145.

The metadata service 170 interacts with the CDN 130-2 to communicate with the media player 145. The CDN 130-2 provides increased scalability and global delivery with minimal latency. Separate CDN 130-2 is provided for the metadata service 170 to provide failover metadata segments in case of service outage due to lack of support from the origin server 110 to provide such functionality. The CDN 130-2 is equipped with a generic segment such as a segment in Hypertext Transfer Protocol HTTP Live Streaming (HLS) consisting of an empty Transport Stream (TS) header with no packetized elementary stream (PES) data. For example, a blank segment consisting of an empty header and no data is provided to the media player 145 during the failover of the metadata service 170 to provide the metadata segments. In another embodiment, other protocols such as a Dynamic Adaptive Streaming over HTTP (DASH), or an SCTE-35 format may be used for various interactions required for the media player 145 to receive the metadata.

The origin server 110 inserts the active substream content in the video stream. The origin server 110 provides the metadata to the media player 145 as requested using the metadata storage 160 and the metadata service 170. The media player 145 communicates with the metadata service 170 using metadata segments to obtain the metadata. The metadata service 170 extracts the metadata responses from the metadata storage 160. The metadata service 170 provides the metadata responses and the timing information in the metadata segments to the media player 145 via the CDN 130-2.

The media player 145 receives the metadata from the metadata segments provided by the metadata service 170. The media player 145 uses a client Software Development Kit (SDK) to extract a functionality associated with the active substream content from the metadata. The client SDK may be a plugin. The functionality includes the interactivity of the media player 145 such as disabling Video Cassette Recorder (VCR) type of controls to fast-forward or skip the active substream content, disabling volume controls during substream-breaks, and/or enabling click-through functionality. The media player 145 customizes the interaction of the media player 145 during the playback of the video stream with the active substream content based on the functionality.

Figure 3:
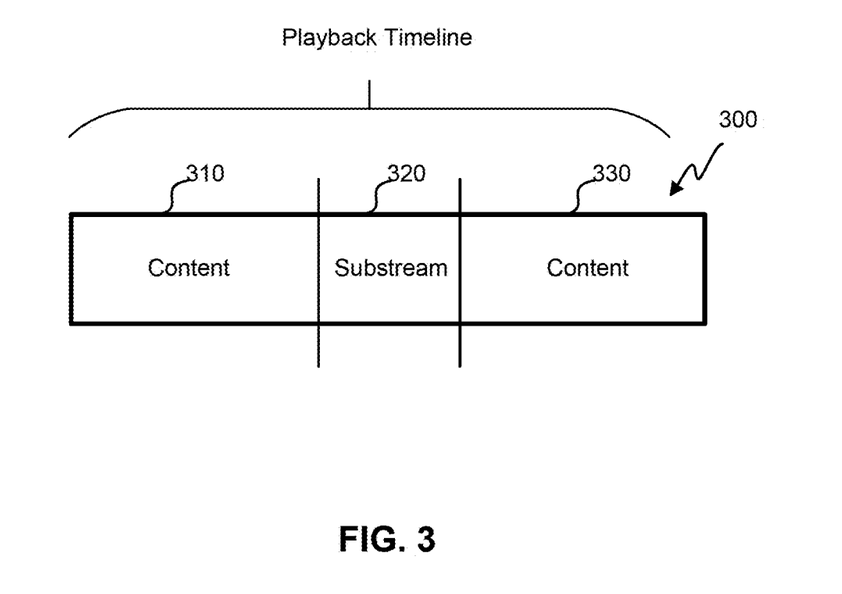
FIG. 3 illustrates a playback timeline for a video stream inserted with an active substream content.

Referring next to FIG. 3, a playback timeline for a video stream 300 inserted with an active substream content 320 is shown. The origin server 110 inserts the active substream content 320 into the video stream 300 after receiving a request for insertion of the active substream content 320 from the media player 145. The video stream 300 includes content segments 310, 330 with the active substream content 320. The active substream content 320 is inserted in a period of break or content break between the content segments 310, 330. The media player 145 uses a plugin for customization of an interface of the media player 145 as the video stream 300 is played with the active substream content 320 inserted into the video stream 300.

Figure 4:
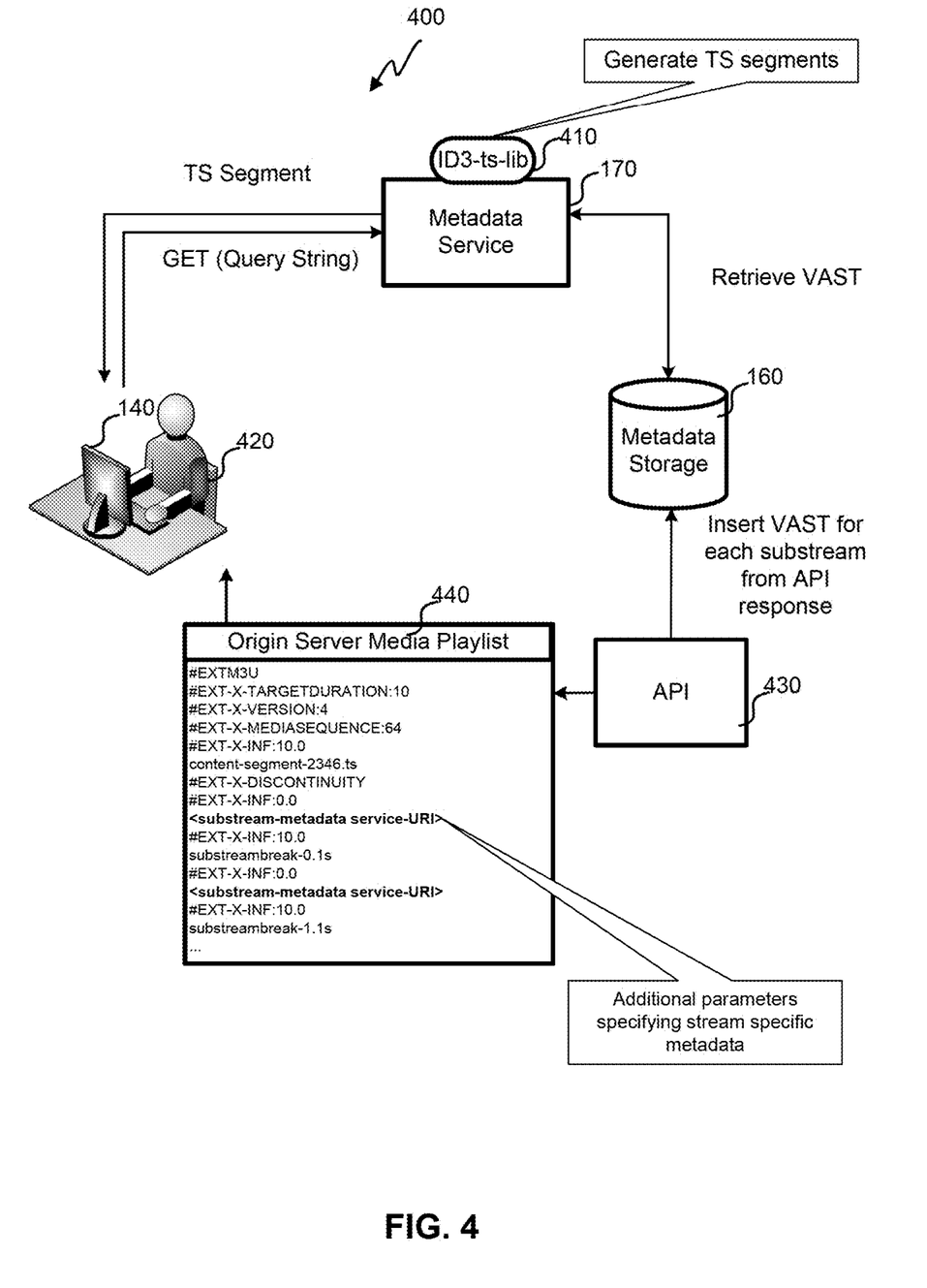
FIG. 4 illustrates a data flow diagram for providing metadata from an origin server to a media player using a metadata service and a metadata storage.

Referring next to FIG. 4, a data flow diagram 400 for providing metadata from the origin server 110 to the media player 145 using the metadata service 170 and the metadata storage 160 is shown. Initially, the media player 145, used by an end-user 420 requests for the metadata associated with an active substream content. The active substream content is to be inserted in a content break of a video stream. The media player 145 makes the request from the metadata service 170 using a GET query string containing encoded parameters for communication with the metadata service 170. A media playlist 440 is received by the media player 145 from the origin server 110 that is used for playing the video stream.

The origin server 110 injects Uniform Resource Identifiers (URIs) into the media playlist 440 of the video stream for zero-second duration metadata segments. The URIs route the request of the media player 145 to the metadata service 170, which serializes metadata responses from the metadata storage 160 into ID3 cue points suitable for parsing by the client SDK. The ID3 cue points include the metadata. The ID3 cue points tag the metadata in metadata tracks of the video stream. The metadata tracks are created by encapsulating at playback time, only the metadata segments required at that particular time.

The metadata responses are provided by the third-party provider 120 to the origin server 110. API 430 of the origin server 110 stores the API or VAST responses for each active substream content with each content break per session in the metadata storage 160. Timing information is provided to the metadata service 170 by the origin server 110. The timing information is related to a playhead position within the content break for example, a time remaining in the active substream content, or a number of active substream contents in the content break, etc. The metadata includes the metadata responses and the timing information.

The metadata service 170 on receiving the GET query string retrieves the metadata responses from the metadata storage 160 using the URIs. An ID3-ts-lib 410 of the metadata service 170 generates a TS segment based on Video Multiple Ad Playlist (VMAP) data constructed from the encoded parameters in the GET query string. The VMAP is compatible with the client SDK and is provided with the VAST data. The TS segment includes the metadata responses and the timing information in the metadata. The TS segment including the metadata is provided to the media player 145 of the client device 140.

As the media player 145 progresses through the media playlist 440, subsequent metadata segments provide timing information and the metadata responses for each active substream content within the content break.

The client SDKs of the media player 145 parse the ID3 metadata cue points obtained from the metadata service 170. The client SDKs are responsible for decoding the ID3 cue points to surface information such as the duration of the active substream content in the content break, their position, as well as any custom VAST extensions from the third-party provider 120 to facilitate interactivity on the page.

The metadata segments are provided in the metadata tracks. The metadata tracks include information on subtitles or karaoke tracks or album data. The information is decoded via a playback engine of the media player 145 by parsing the ID3 cues within the metadata segments in a client-agnostic fashion. The metadata tracks are separated from audio and video tracks required for the video stream playback. The separated metadata tracks allow players without a compatible client SDK to safely ignore the metadata tracks without loss of existing functionality for the playback, analytics, or custom integrations. This helps both old and new media players to be used for playback avoiding any disruption. In addition, the developers of the media player 145 can customize how the media player 145 interacts with content breaks. This can include click-through interactions within the content breaks, custom page styling off of playback-level events, and custom analytics. Developers of the client SDK can configure analytics to be sent by the origin server 110 or the media player 145 to match their specific use case.

Figure 5:
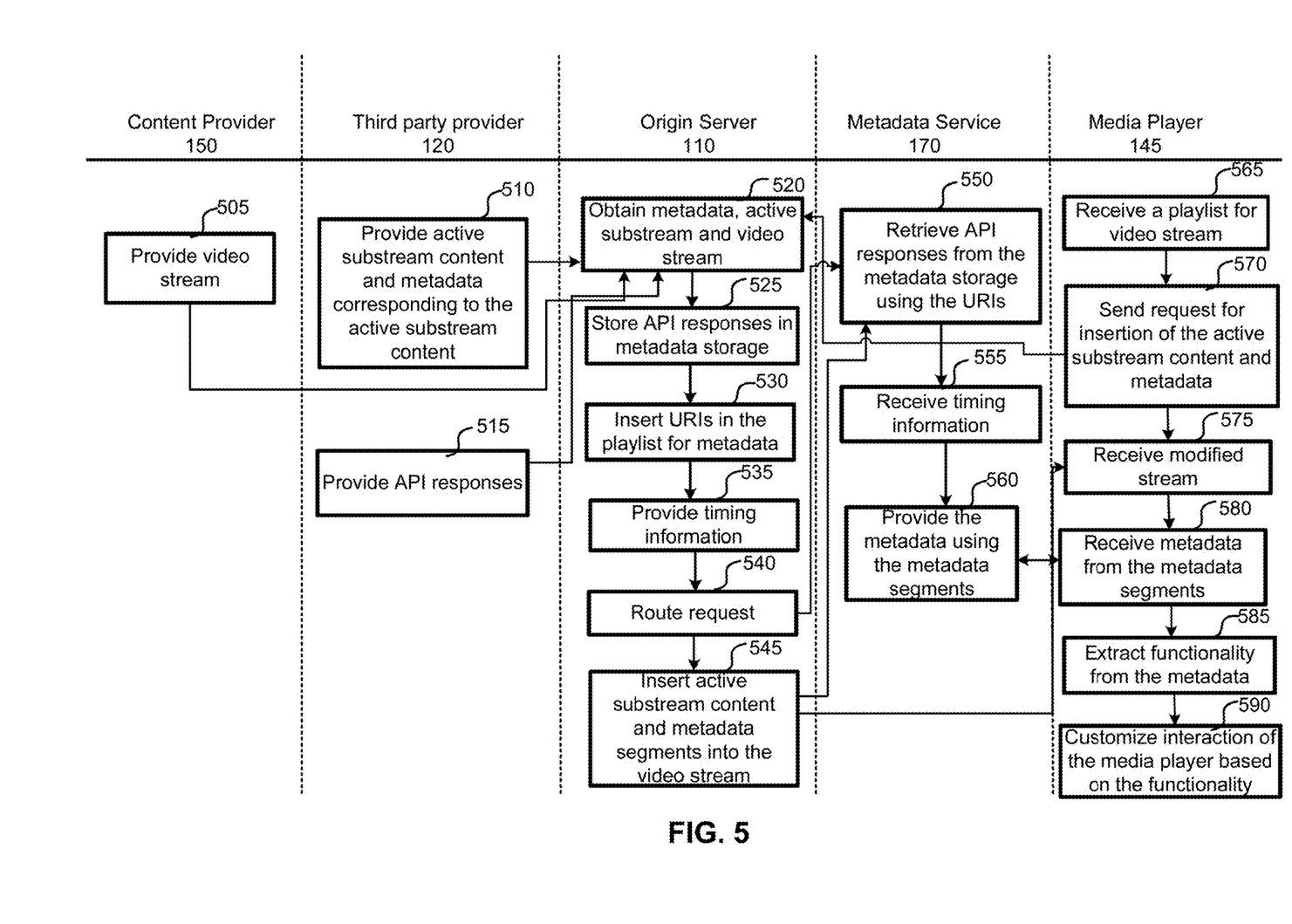
FIG. 5 illustrates a swim-lane diagram for interactions between a content provider, a third-party provider, an origin server, a metadata service, and a media player.

Referring next to FIG. 5, a swim-lane diagram illustrating interactions between the content provider 150, the third-party provider 120, the origin server 110, the metadata service 170, and the media player 145 is shown.

At block 505, the content provider 150 provides a video stream to the origin server 110 for playback at the media player 145. The video stream may be a video or a media content with one or more content breaks or ad breaks for insertion of an active media content such as an ad.

At block 510, the third-party provider 120 provides the active substream content and metadata associated with the active substream content to the origin server 110.

At block 515, the third-party provider 120 provides API responses to the origin server 110. The API responses include VAST responses or interaction-specific data for the media player 145.

At block 520, the origin server 110 receives the video stream from the content provider 150 for playback.

At block 525, the origin server 110 stores the API responses in the metadata storage 160.

At block 530, the origin server 110 inserts URIs in a playlist for playing the video stream at the media player 145. The playlist is used by the media player 145 for requesting the metadata. The playlist is provided to the media player 145 for playback of the video stream. The playlist includes zero-second duration segments with ID3 cue points associated with the request for metadata, which may help ensure backward compatibility with older players.

At block 535, the origin server 110 provides timing information to the metadata service 170. The timing information includes start time and end time of the active substream content within the content break, a number of active substream contents, and/or timing of each of the active substream contents.

At block 540, the origin server 110 routes a request to the metadata service 170 received from the media player 145 regarding insertion of the active substream content and the metadata.

At block 545, the origin server 110 inserts the active substream content along with metadata segments into the video stream to produce a modified video stream. The modified video stream is provided to the media player 145 and the metadata service 170.

At block 550, on receiving the request for the metadata routed by the origin server 110, the metadata service 170 retrieves the API responses. The API responses are retrieved from the metadata storage 160 using the URIs.

At block 555, the metadata service 170 receives the timing information from the origin server 110.

At block 560, the metadata service 170 provides the metadata segments for the metadata to the media player 145. The metadata includes the API responses and the timing information.

At block 565, the media player 145 receives the playlist from the origin server 110 for playback of the video stream.

At block 570, the media player 145 sends a request for the metadata using the playlist to the origin server 110. The request is associated with the insertion of the active substream content in the playback of the video stream.

At block 575, the media player 145 receives the modified video stream from the origin server 110.

At block 580, the media player 145 receives the metadata from the metadata segments provided by the metadata service 170.

At block 585, the media player 145 uses a client SDK or a plugin to extract a functionality from the metadata. The functionality is associated with an interaction of the media player 145 while playing the modified video stream.

At block 590, the interaction of the media player 145 is customized based on the functionality associated with the metadata. The customized interaction includes modification of styling and interactivity during content breaks.

Figure 6:
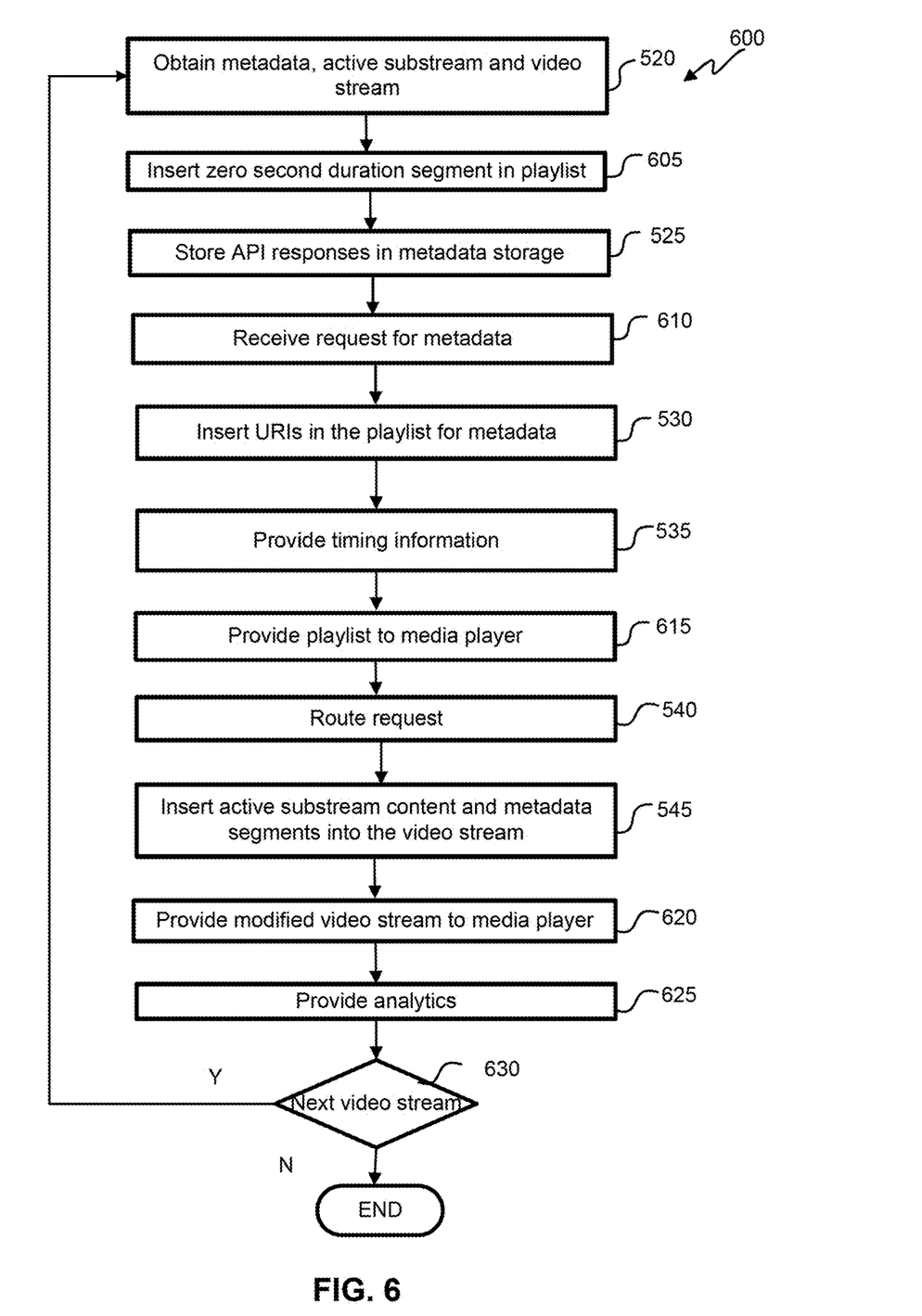
FIG. 6 illustrates a flowchart of a method for providing customized interaction of a media player during playback of a video based on metadata.

Referring next to FIG. 6, a flowchart of a method 600 for providing customized interaction of a media player during playback of a video based on metadata is shown. The steps of the method 600 are performed by the origin server 110.

At block 520, the origin server 110 obtains a video stream for playback along with an active substream content to be inserted into the video stream. A metadata associated with the active substream content is also received by the origin server 110.

At block 605, the origin server 110 inserts a zero-second duration segment in a playlist for playing the video stream. The zero-second duration segment include an ID3 cue point containing metadata specific to the active substream content within a content break.

At block 525, API responses corresponding to the metadata are stored in the metadata storage 160. The origin server 110 uses a server API for storing the API responses received from the third-party provider 120 in the metadata storage 160. The server API inserts the API responses specifically VAST responses for the active substream content within the content break per session from ads-API response in the playlist. The API responses inserted into the content break are stored in the metadata storage 160.

At block 610, a request for metadata is received from the media player 145 by the origin server 110.

At block 530, the origin server 110 inserts URIs into the playlist using the server API. The origin server 110 inserts URIs into the playlist for the zero-second duration segment of the metadata.

At block 535, the origin server 110 provides the timing information to the metadata service 170. The timing information includes timing of the active substream content.

At block 615, the origin server 110 provides the playlist to the media player 145 for playback of the video stream.

At block 540, the origin server 110 routes the request received from the media player 145 to the metadata service 170 for providing the metadata.

At block 545, the active substream content along with metadata segments is inserted into the video stream to obtain a modified video stream.

At block 620, the modified video stream is provided to the media player 145. The metadata segments are used by the media player 145 to request the metadata service 170 for the metadata.

At block 625, analytics related to the viewing of the modified video stream or playback-related analytics are provided to the third-party provider 120. The analytics may further be used by the developers for customizing the active substream content. Developers may configure analytics provided by the origin server 110 to match their specific use case.

At block 630, the origin server 110 determines whether the next video stream is received for processing. If there are subsequent video streams for playback, the control moves to block 520, else the method ends.

Figure 7:
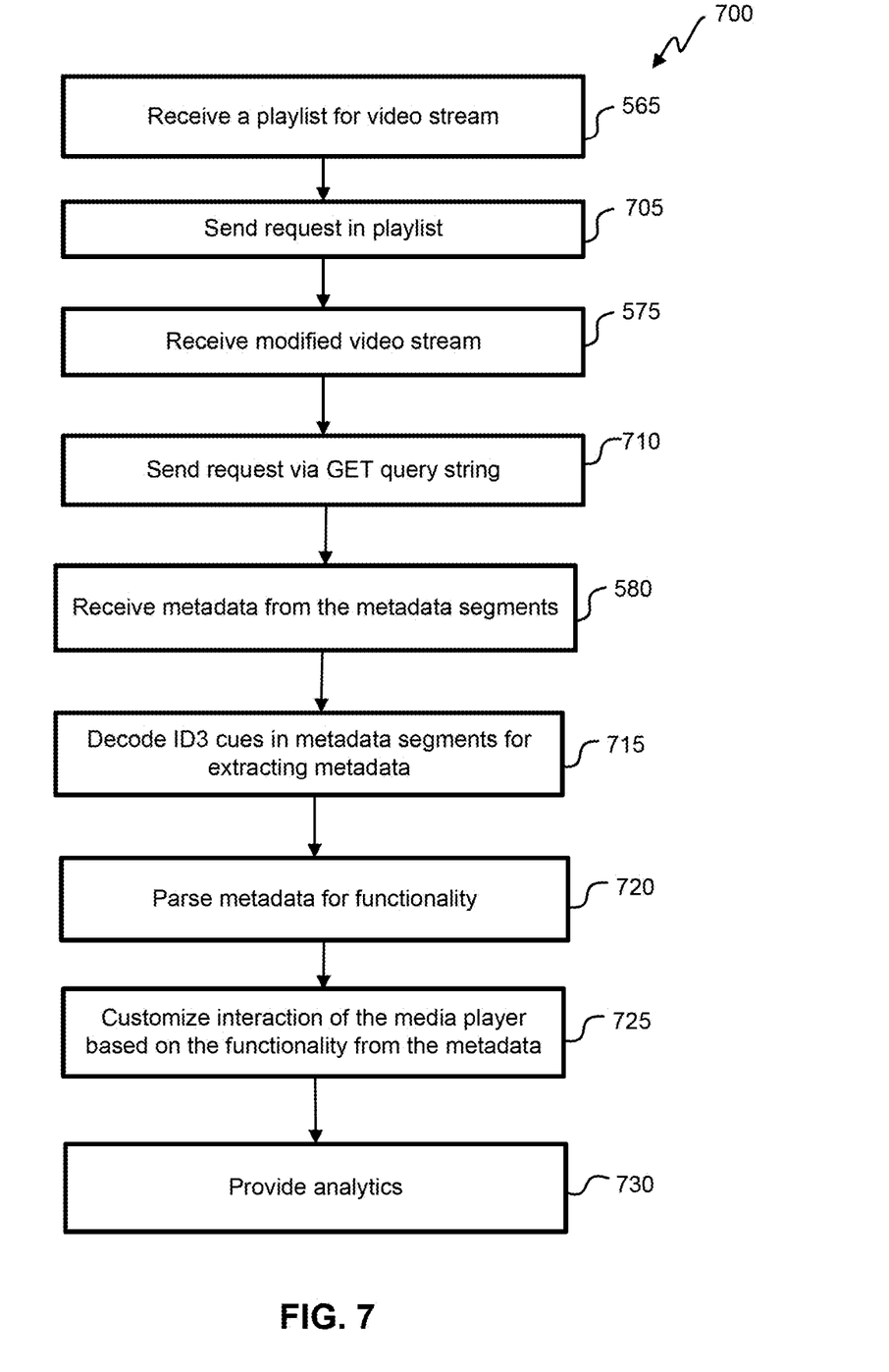
FIG. 7 illustrates a flowchart of a method for customizing a behavior of a media player during playback of a video based on metadata.

Referring next to FIG. 7, a flowchart of a method 700 for customizing a behavior of a media player during playback of a video based on metadata is shown. The steps of the method 700 are performed by the media player 145.

At block 565, a playlist for playing a video stream is received by the media player 145 from the origin server 110. The playlist includes a request for insertion of an active substream content into the video stream and metadata associated with the active substream content during a content break. The playlist includes a zero-second duration segment associated with the request for the metadata, which ensures compatibility with different types of media players. The zero-second duration segment includes ID3 cues containing metadata associated with the active substream content.

At block 705, the request in the playlist is sent to the origin server 110 for the insertion of the active substream content and the metadata. After receiving the request, the origin server 110 routes the request to the metadata service 170.

At block 575, the media player 145 receives a modified video stream from the origin server 110. The modified video stream includes the active substream content and metadata segments. The metadata segments are used by the media player 145 for communicating with the metadata service 170.

At block 710, the media player 145 generates a GET query string to request the metadata service 170. The GET query string is sent to the metadata service 170 requesting for the metadata.

At block 580, the metadata segments including the metadata is received by the media player 145 from the metadata service 170. The metadata includes API responses and timing information associated with the active substream content.

At block 715, a client SDK or a plugin of the media player 145 decodes ID3 cues in the metadata segments for extracting the metadata.

At block 720, the client SDK parses the extracted metadata for extracting a functionality associated with customization of the interaction of the media player 145. The functionality includes, disabling VCR-type of controls to fast-forward or skip the active substream content, disabling volume controls during content-breaks, enabling click-through functionality. The entire video region or any subset of it could be turned into an addressable space, and by clicking on which a user can be forwarded to pages or services associated with the active substream content, enabling "companion ads" shown alongside video content which allow for ad opportunities outside the streaming content, achieve precise impression counting, as it applies specifically to ad content that was inserted, and/or other possible customizations of player's behavior that is desirable based on the content of the active substream content.

At block 725, the styling and interaction of the media player 145 is customized during playback of the modified video stream based on the functionality. Developers may use the client SDK to customize the interaction of the media player 145 with content breaks. This customization may include click-through interactions within the content breaks, custom page styling off of playback-level events, and custom analytics.

At block 730, the media player 145 provides analytics as instructed via the metadata to analytics repositories (not shown) based on developer configuration settings. Developers configure analytics sent by the media player 145 to match their specific requirements.

Figure 8:
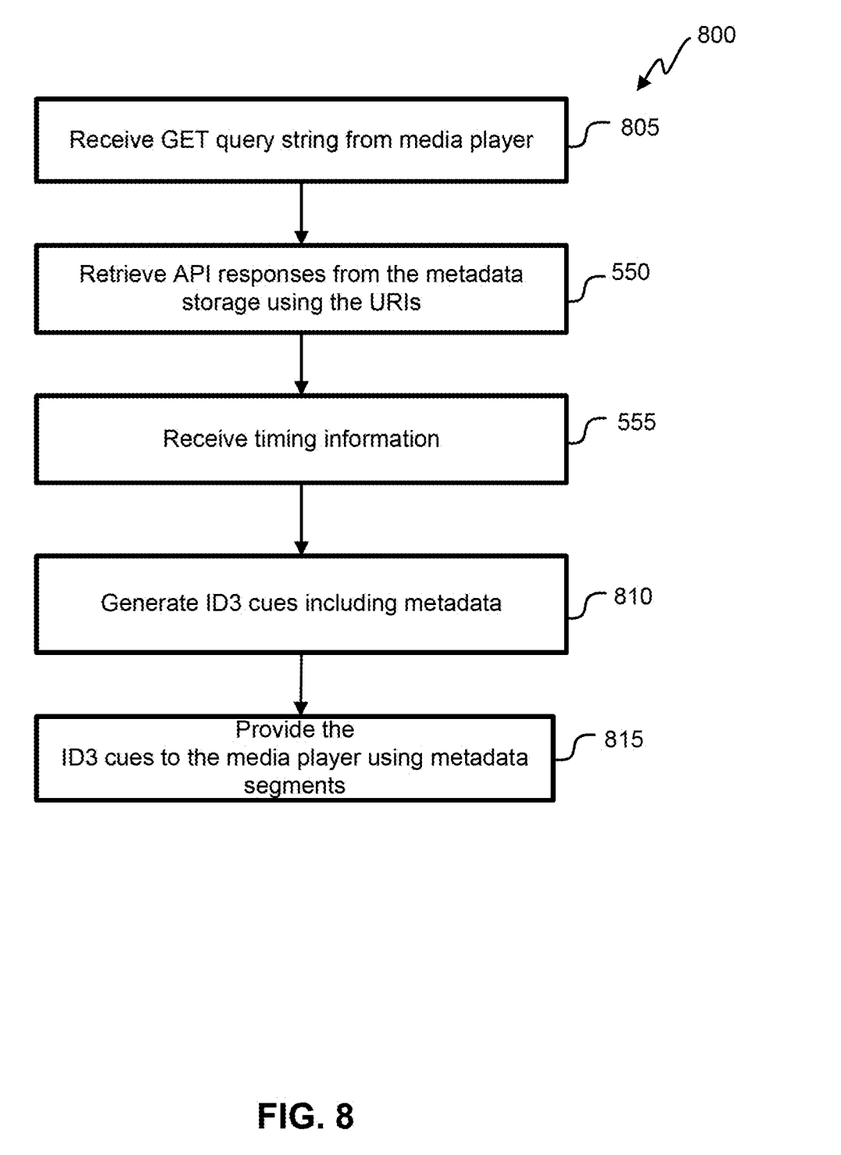
FIG. 8 illustrates a flowchart for providing metadata associated with customization information to a media player.

Referring next to FIG. 8, a flowchart of a method 800 for providing metadata associated with customization information to a media player is shown. The steps of the method 800 are performed by the metadata service 170.

At block 805, the metadata service 170 receives a request for metadata associated with an active substream content from the media player 145. The active substream content is to be inserted in a video stream played by the media player 145. The request is provided via a GET query string from the media player 145.

At block 550, after receiving the request for metadata, the metadata service 170 retrieves API responses from the metadata storage 160.

At block 555, timing information associated with the active substream content is received from the origin server 110. The timing information includes a time left in the active substream content, a duration of the active substream content, or the number of active substream contents in a content break.

At block 810, the metadata service 170 generates ID3 cues including the metadata.

At block 815, the metadata service 170 sends the ID3 cues in transport stream (TS) segments using the metadata segments to the media player 145. The TS segments are sent as a response to the request of the media player 145 for the metadata. The metadata is extracted by the media player 145 from the ID3 cues for customization of behavior of the media player 145 during the playback of the video stream with the active substream content.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application-specific integrated circuits (ASICs), digital signal processors (DSPs), digital signal processing devices (DSPDs), programmable logic devices (PLDs), field-programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. The memory may be implemented within the processor or external to the processor. As used herein the term "memory" refers to any type of long-term, short-term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as a limitation on the scope of the disclosure.

What is claimed is:

1. A method of providing customized interaction of a media player during playback of a video at the media player based on metadata, the method comprising:
   obtaining by an origin server from a third-party provider, metadata corresponding to an active substream content for the playback of a primary video stream, and storing the metadata by the origin server in a metadata storage;
   providing, to the media player, a playlist for playing the primary video stream, wherein the playlist includes a request for the metadata, and the request is associated with an insertion of the active substream content in the playback of the primary video stream;
   receiving by the origin server from the media player, the request for the metadata, wherein the request is received during the playback of the primary video stream at the media player;
   inserting by the origin server, Uniform Resource Identifiers (URIs) into the playlist for the metadata;
   inserting by the origin server, the active substream content along with metadata segments in the primary video stream for obtaining a secondary video stream;
   providing by the origin server to the media player using a metadata service, the metadata corresponding to the active substream content, wherein providing the metadata by the origin server to the media player comprises:
      retrieving by the metadata service:
         Application Programming Interface (API) responses from the metadata storage using the URIs, and
         timing information of the active substream content from the origin server, wherein the metadata including the timing information and the API responses is provided to the media player by the metadata service using the metadata segments;
   extracting by the media player, a functionality associated with the active sub stream content from the metadata; and customizing by the media player, an interaction of the media player during the playback of the secondary video stream based on the functionality associated with the active substream content.

2. The method of providing customized interaction of a media player during playback of a video at the media player based on metadata as recited in claim 1, wherein the functionality includes disabling videocassette recorder (VCR) type of controls to fast-forward or skip the active substream content, disabling volume controls during substream-breaks, and/or enabling click-through functionality.

3. The method of providing customized interaction of a media player during playback of a video at the media player based on metadata as recited in claim 1, further comprising:
providing by the origin server, analytics to the third-party provider; and
providing by the media player, the analytics via the metadata.

4. The method of providing customized interaction of a media player during playback of a video at the media player based on metadata as recited in claim 1, wherein the API responses include Video Ad Serving Template (VAST).

5. The method of providing customized interaction of a media player during playback of a video at the media player based on metadata as recited in claim 1, wherein a Content Delivery Network (CDN) provides a blank segment consisting of an empty header and no data to the media player during failover of the metadata service to provide the metadata segments.

6. The method of providing customized interaction of a media player during playback of a video at the media player based on metadata as recited in claim 1, wherein metadata tracks of the metadata include customization information for the media player, and the metadata tracks are separate from audio and video tracks of the secondary video stream.

7. The method of providing customized interaction of a media player during playback of a video at the media player based on metadata as recited in claim 1, wherein a plugin is used by the media player to parse the metadata to customize the interaction of the media player.

8. The method of providing customized interaction of a media player during playback of a video at the media player based on metadata as recited in claim 1, wherein the playlist further includes a zero-second duration segment associated with the request for the metadata.

9. The method of providing customized interaction of a media player during playback of a video at the media player based on metadata as recited in claim 1, wherein the primary video stream is in a Hypertext Transfer Protocol (HTTP) Live Streaming (HLS) format, a Dynamic Adaptive Streaming over HTTP (DASH), or an SCTE-35 format.

10. A server configured to provide metadata for customization of an interaction of a media player during playback of a video at the media player, the server comprising:
a communication interface;
a memory; and
a processor coupled with the communication interface and the memory, wherein the processor is configured to perform functions including:
obtaining from a third-party provider, metadata corresponding to an active sub stream content for the playback of a primary video stream, and storing the metadata in a metadata storage, wherein:
a playlist for playing the primary video stream is provided to the media player,
the playlist includes a request for the metadata, and the request is associated with an insertion of the active substream content in the playback of the primary video stream;
receiving from the media player, the request for the metadata, wherein the request is received during the playback of the primary video stream at the media player;
inserting Uniform Resource Identifiers (URIs) into the playlist for the metadata;
inserting the active substream content along with metadata segments in the primary video stream for obtaining a secondary video stream;
providing to a metadata service timing information of the active substream content;
providing to the media player using the metadata service, the metadata corresponding to the active substream content, wherein:
Application Programming Interface (API) responses are retrieved from the metadata storage by the metadata service using the URIs,
the metadata including the timing information and the API responses is provided to the media player by the metadata service using the metadata segments, and
the media player extracts a functionality associated with the active substream content from the metadata to customize the interaction of the media player during the playback of the secondary video stream.

11. The server configured to provide metadata for customization of interaction of a media player during playback of a video at the media player as recited in claim 10, wherein the functionality includes disabling videocassette recorder (VCR) type of controls to fast-forward or skip the active substream content, disabling volume controls during substream-breaks, and/or enabling click-through functionality.

12. The server configured to provide metadata for customization of interaction of a media player during playback of a video at the media player as recited in claim 10, further comprising:
providing analytics to the third-party provider,
wherein the media player provides the analytics via the metadata.

13. The server configured to provide metadata for customization of interaction of a media player during playback of a video at the media player as recited in claim 10, wherein the API responses include Video Ad Serving Template (VAST).

14. The server configured to provide metadata for customization of interaction of a media player during playback of a video at the media player as recited in claim 10, wherein a Content Delivery Network (CDN) provides a blank segment consisting of an empty header and no data to the media player during failover of the metadata service to provide the metadata segments.

15. The server configured to provide metadata for customization of interaction of a media player during playback of a video at the media player as recited in claim 10, wherein metadata tracks of the metadata include customization information for the media player, and the metadata tracks are separate from audio and video tracks of the secondary video stream.

16. The server configured to provide metadata for customization of interaction of a media player during playback of a video at the media player as recited in claim 10, wherein a plugin is used by the media player to parse the metadata to customize the interaction of the media player.

17. The server configured to provide metadata for customization of interaction of a media player during playback of a video at the media player as recited in claim 10, wherein the playlist further includes a zero-second duration segment associated with the request for the metadata.

18. A non-transitory computer-readable medium having instructions embedded thereon for customizing interaction of a media player based on metadata during playback of a video, wherein the instructions, when executed by one or more computers, cause the one or more computers to:
   obtain by an origin server from a third-party provider, metadata corresponding to an active substream content for the playback of a primary video stream, and store the metadata by the origin server in a metadata storage;
   provide, to the media player, a playlist for playing the primary video stream, wherein the playlist includes a request for the metadata, and the request is associated with an insertion of the active substream content in the playback of the primary video stream;
   receive by the origin server from the media player, the request for the metadata, wherein the request is received during the playback of the primary video stream at the media player;
   insert by the origin server, Uniform Resource Identifiers (URIs) into the playlist for the metadata;
   insert by the origin server, the active substream content along with metadata segments in the primary video stream for obtaining a secondary video stream;
   provide by the origin server to the media player using a metadata service, the metadata corresponding to the active substream content, wherein providing the metadata by the origin server to the media player comprises:
   retrieve by the metadata service:
      Application Programming Interface (API) responses from the metadata storage using the URIs, and
      timing information of the active substream content from the origin server, wherein the metadata including the timing information and the API responses is provided to the media player by the metadata service using the metadata segments;
   extract by the media player, a functionality associated with the active substream content from the metadata; and
   customize by the media player, the interaction of the media player during the playback of the secondary video stream based on the functionality associated with the active substream content.

19. The non-transitory computer-readable medium as recited in claim 18, wherein the primary video stream is in a Hypertext Transfer Protocol (HTTP) Live Streaming (HLS) format, a Dynamic Adaptive Streaming over HTTP (DASH), or an SCTE-35 format.

20. The non-transitory computer-readable medium as recited in claim 18, wherein the playlist further includes a zero-second duration segment associated with the request for the metadata.

\* \* \* \* \*